United States Patent
Song et al.

(10) Patent No.: US 11,552,288 B2
(45) Date of Patent: Jan. 10, 2023

(54) METHOD FOR ANALYZING COHESIVE FAILURE OF ELECTRODE

(71) Applicant: LG CHEM, LTD., Seoul (KR)

(72) Inventors: In Young Song, Daejeon (KR); Joo Yul Baek, Daejeon (KR); Jeong Kyu Lee, Daejeon (KR); Sung Joon Oh, Daejeon (KR); Jong Chan Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 262 days.

(21) Appl. No.: 16/995,976

(22) Filed: Aug. 18, 2020

(65) Prior Publication Data

US 2021/0057728 A1     Feb. 25, 2021

(30) Foreign Application Priority Data

Aug. 19, 2019  (KR) .................. 10-2019-0101342
Aug. 4, 2020   (KR) .................. 10-2020-0097112

(51) Int. Cl.
*H01M 10/42*     (2006.01)
*H01M 4/36*      (2006.01)
(Continued)

(52) U.S. Cl.
CPC ......... *H01M 4/364* (2013.01); *H01M 4/0404* (2013.01); *H01M 4/133* (2013.01);
(Continued)

(58) Field of Classification Search
CPC .... H01M 4/0404; H01M 4/133; H01M 4/364; H01M 4/366; H01M 4/623; H01M 10/0525
See application file for complete search history.

(56) References Cited

U.S. PATENT DOCUMENTS 10,141,575 B2   11/2018  Yamashita et al.
2016/0163812 A1  6/2016  Ushijima et al.
(Continued)

FOREIGN PATENT DOCUMENTS

JP   2013-62139 A    4/2013
JP   2013-109853 A   6/2013
(Continued)

OTHER PUBLICATIONS

Son et al., Measurement and Analysis of Adhesion Property of Lithium-Ion Battery Electrodes with SAICAS, ACS Appl. Mater. Interfaces 2014, 6, 526-531 (Year: 2014).*
(Continued)

*Primary Examiner* — Ula C Ruddock
(74) *Attorney, Agent, or Firm* — Birch, Stewart, Kolasch & Birch, LLP

(57) ABSTRACT

A method for quantitatively analyzing cohesive failure of an electrode analyzes cohesive failure of an electrode and includes preparing an electrode in which an electrode material mixture layer including an electrode active material, a conductive agent, and a binder is formed on a current collector, measuring shear strength ($\sigma$) data according to a cutting depth while cutting the electrode material mixture layer from a surface thereof until reaching the current collector using a surface and interfacial cutting analysis system (SAICAS), obtaining a regression curve of shear strength according to the cutting depth from the shear strength ($\sigma$) data, and determining a cutting depth, at which the shear strength is minimum in the regression curve, as a location of cohesive failure.

8 Claims, 4 Drawing Sheets

(51) Int. Cl.
  *H01M 4/04*       (2006.01)
  *H01M 4/133*      (2010.01)
  *H01M 4/62*       (2006.01)
  *H01M 10/0525*    (2010.01)
  *H01M 4/02*       (2006.01)

(52) U.S. Cl.
  CPC ........... *H01M 4/366* (2013.01); *H01M 4/623* (2013.01); *H01M 10/0525* (2013.01); *H01M 10/4285* (2013.01); *H01M 2004/021* (2013.01)

(56) References Cited

U.S. PATENT DOCUMENTS

| | | | |
|---|---|---|---|
| 2018/0083284 A1 | 3/2018 | Yamashita et al. | |
| 2018/0210034 A1 | 7/2018 | Lee et al. | |
| 2019/0169381 A1* | 6/2019 | Okoshi | C08K 7/06 |
| 2019/0312259 A1* | 10/2019 | Baek | H01M 4/62 |

FOREIGN PATENT DOCUMENTS

| | | |
|---|---|---|
| JP | 6038056 B2 | 12/2016 |
| KR | 10-2017-0042175 A | 4/2017 |
| KR | 10-2017-0048210 A | 5/2017 |
| KR | 10-2018-0032162 A | 3/2018 |
| KR | 10-2019-0026220 A | 3/2019 |

OTHER PUBLICATIONS

Shalabh, Regression Analysis, Chapter 12, Polynomial Regression Models, available at http://home.iitk.ac.in/~shalab/regression/Chapter12-Regression-PolynomialRegression.pdf, last visited Jun. 29, 2022 (Year: 2020).*

Extended European Search Report for European Application No. 20190639.3, dated Jan. 21, 2021.

Son et al., "Measurement and Analysis of Adhesion Property of Lithium-Ion Battery Electrodes with SAICAS", ACS Appl. Mater. Interfaces, vol. 6, 2014, pp. 526-531.

Song et al., "Soluble Polyimide Binder for Silicon Electrodes in Lithium Secondary Batteries", Appl. Chem. Eng., vol. 26, No. 6, Dec. 2015, pp. 674-680.

* cited by examiner

[FIG. 1]
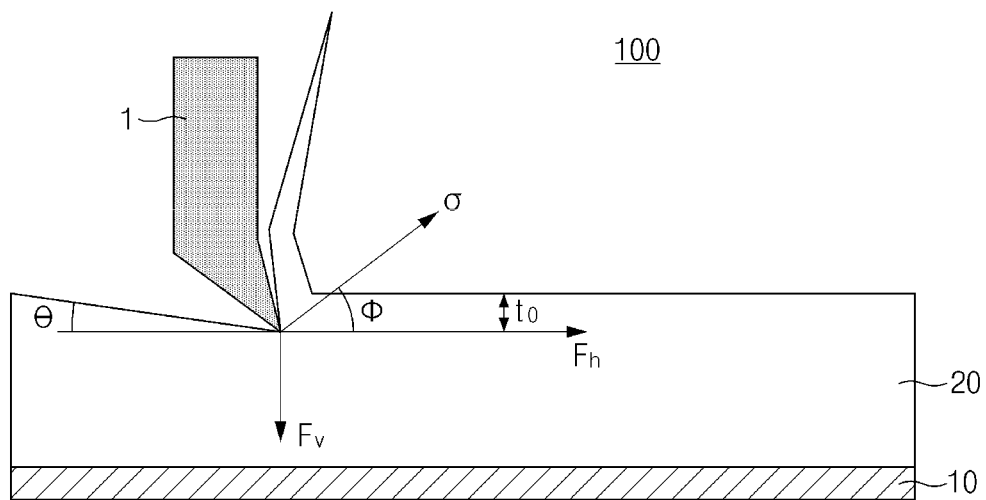

[FIG. 2]
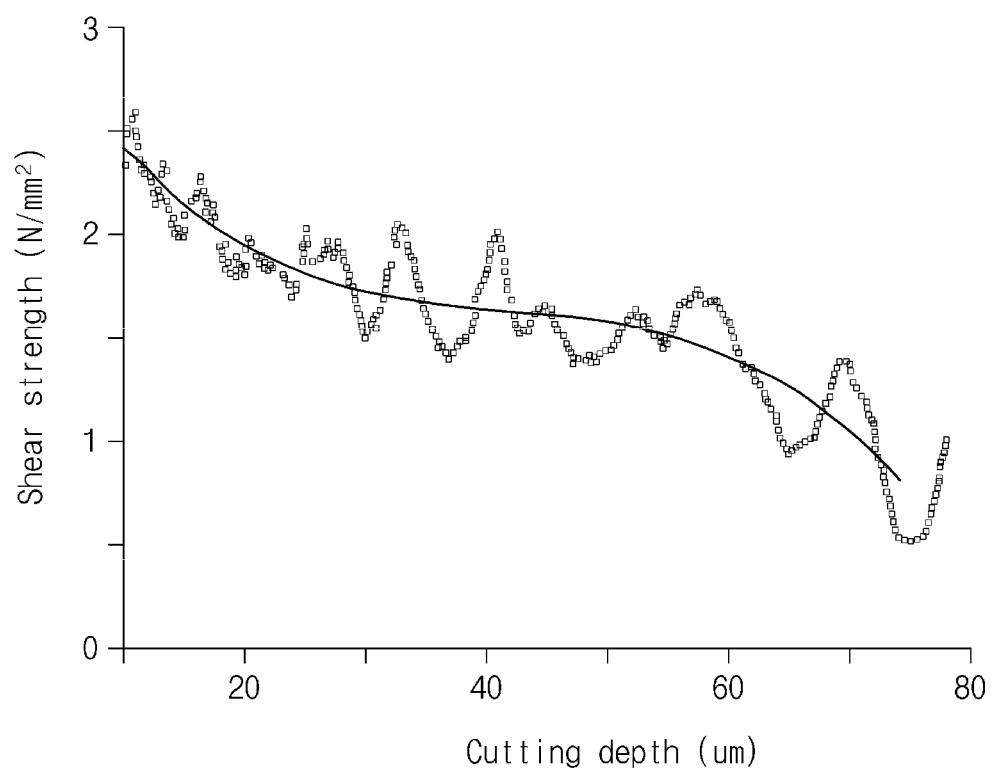

[FIG. 3]
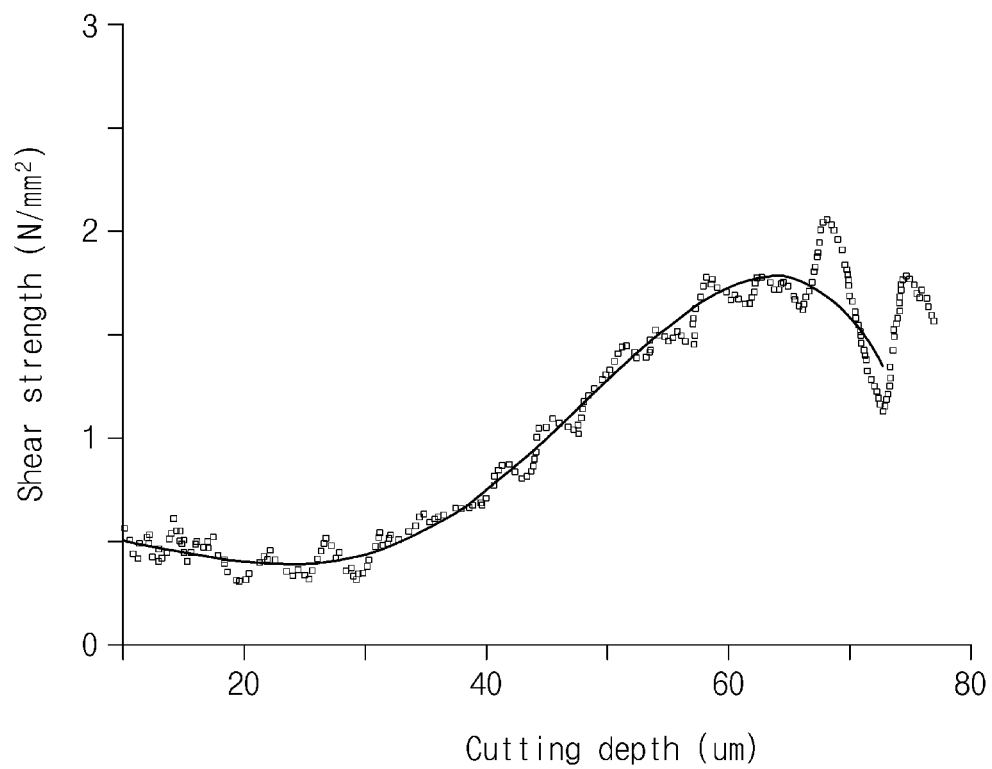

[FIG. 4]
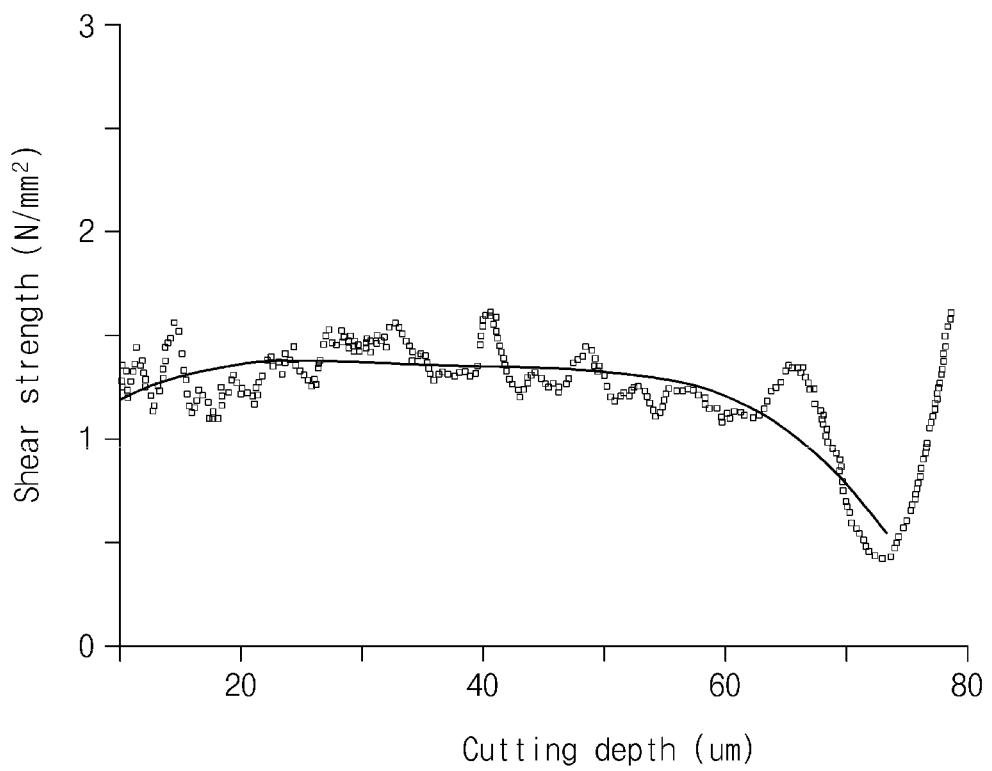

METHOD FOR ANALYZING COHESIVE FAILURE OF ELECTRODE

CROSS-REFERENCE TO RELATED APPLICATIONS

This application claims the priority of Korean Patent Application Nos. 10-2019-0101342 filed on Aug. 19, 2019 and 10-2020-0097112 filed on Aug. 4, 2020, in the Korean Intellectual Property Office, the disclosure of which is incorporated herein by reference.

BACKGROUND OF THE INVENTION

Field of the Invention

The present invention relates to a method of analyzing cohesive failure of an electrode, and more particularly, to a method of analyzing cohesive failure of an electrode for a lithium secondary battery.

Description of the Related Art

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated into or deintercalated from the positive electrode and the negative electrode.

With respect to the electrode active material, a conductive agent, and a current collector which constitute the electrode of the lithium secondary battery, bonding forces between the components of the electrode may be increased by a polymer binder, and an exfoliation phenomenon of the electrode may be suppressed during coating, drying, and rolling processes of the electrode. Also, output characteristics may be improved by increasing electrical conductivity through the conductive agent.

However, since an amount of the polymer binder having insulator properties in a limited space of the electrode is minimized to increase capacity of the electrode, a problem of cohesive failure of an electrode material mixture layer due to a decrease in binding force occurs. The cohesive failure is a phenomenon in which crack or exfoliation occurs in the electrode material mixture layer because cohesion is lost due to particle breakage or tearing between particle-binder-particle when stress is applied to the electrode due to expansion/contraction during charge and discharge cycles, external impact, etc., wherein battery performance is degraded when the cohesive failure occurs.

Also, the cohesive failure of the electrode material mixture layer may be caused by non-uniformity of the binder in the electrode according to process conditions.

Recently, a multilayer electrode, in which two or more electrode material mixture layers having different active material types and contents, binder types and contents, etc. are formed to control battery life characteristics, capacity, and strength characteristics, has been developed, wherein, with respect to the multilayer electrode, the cohesive failure phenomenon may be intensified at an interface between the electrode material mixture layers due to differences in strengths of the different electrode active materials and adhesion between each layer.

Life characteristics of the secondary battery are significantly degraded when the cohesive failure occurs in the electrode material mixture layer. Thus, in order to prepare a secondary battery with excellent quality characteristics, an electrode with little cohesive failure must be prepared, and, for this purpose, there is a need to appropriately adjust a composition of the electrode material mixture layer or process conditions.

However, since there is no method of quantitatively analyzing the cohesive failure of the electrode material mixture layer to date, it is difficult to improve the composition of the electrode material mixture layer or process conditions so as to minimize the cohesive failure in an electrode preparation step.

PRIOR ART DOCUMENT

Patent Document

Japanese Patent Application Laid-open Publication No. 2013-062139

SUMMARY OF THE INVENTION

An aspect of the present invention provides a method which may quantitatively analyze a location of cohesive failure of an electrode in a preparation step of the electrode without performing secondary battery preparation and battery characteristics evaluation steps.

According to an aspect of the present invention, there is provided a method of analyzing cohesive failure of an electrode which includes: preparing an electrode in which an electrode material mixture layer including an electrode active material, a conductive agent, and a binder is formed on a current collector; measuring shear strength ($\sigma$) data according to a cutting depth while cutting the electrode material mixture layer from a surface of the electrode until reaching the current collector using a surface and interfacial cutting analysis system (SAICAS); obtaining a regression curve of shear strength according to the cutting depth from the shear strength ($\sigma$) data; determining a cutting depth, at which the shear strength is minimum in the regression curve, as a location of cohesive failure and optionally, adjusting a composition of the electrode material mixture layer or process conditions.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a schematic view illustrating a process of cutting an electrode material mixture layer using a surface and interfacial cutting analysis system;

FIG. 2 is a graph illustrating shear strength data and a regression curve according to Example 1;

FIG. 3 is a graph illustrating shear strength data and a regression curve according to Example 2; and FIG. 4 is a graph illustrating shear strength data and a regression curve according to Example 3.

DETAILED DESCRIPTION OF THE PREFERRED EMBODIMENT

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

A method of analyzing cohesive failure of an electrode of the present invention includes the steps of: preparing an electrode in which an electrode material mixture layer including an electrode active material, a conductive agent, and a binder is formed on a current collector; measuring shear strength (σ) data according to a cutting depth by obliquely cutting the electrode material mixture layer from a surface thereof until reaching the current collector using a surface and interfacial cutting analysis system (SAICAS); obtaining a regression curve of shear strength according to the cutting depth from the shear strength (σ) data; determining a cutting depth, at which the shear strength is minimum in the regression curve, as a location of cohesive failure and optionally, adjusting a composition of the electrode material mixture layer or process conditions.

In the following, the method of analyzing cohesive failure of an electrode will be described in detail for each step.

(1) Electrode Preparing Step

First, an electrode, in which an electrode material mixture layer including an electrode active material, a conductive agent, and a binder is formed on a current collector, is prepared.

The electrode may be a positive electrode or negative electrode for a lithium secondary battery.

The positive electrode may include a positive electrode collector and a positive electrode material mixture layer which is formed on the positive electrode collector and includes a positive electrode active material, a conductive agent, and a binder.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on a surface of the collector to improve adhesion of the positive electrode active material. The positive electrode collector, for example, may be used in various shapes such as that of a film, a sheet, a foil, a net, a porous body, a foam body, a non-woven fabric body, and the like.

The positive electrode active material is not particularly limited, but one typically used as a positive electrode active material of a lithium secondary battery may be used without limitation, and, for example, a lithium transition metal oxide including at least one transition metal cation selected from the group consisting of cobalt (Co), nickel (Ni), and manganese (Mn) may be used. Specifically, the positive electrode active material may include a layered compound such as lithium cobalt oxide ($LiCoO_2$) or lithium nickel oxide ($LiNiO_2$), lithium manganese oxides such as $Li_{1+n}Mn_{2-n}O_4$ (where n is 0 to 0.33), $LiMnO_3$, $LiMn_2O_3$, and $LiMnO_2$, Ni-site type lithium nickel oxide represented by the chemical formula $LiNi_{1-m}M^a{}_mO_2$ (where $M^a$=Co, Mn, aluminum (Al), copper (Cu), iron (Fe), magnesium (Mg), boron (B), or gallium (Ga), and m=0.01 to 0.3), lithium manganese composite oxide represented by the chemical formula $LiMn_{2-z}M^b{}_zO_2$ (where $M^b$=Co, Ni, Fe, chromium (Cr), zinc (Zn), or tantalum (Ta), and z=0.01 to 0.1) or $Li_2Mn_3M^cO_8$ (where $M^c$=Fe, Co, Ni, Cu, or Zn), spinel-structured lithium manganese composite oxide represented by $LiNi_rMn_{2-r}O_4$ (where r=0.01 to 1), and a lithium iron phosphate compound ($LiFePO_4$), but the positive electrode active material is not limited thereto. Also, a lithium composite transition metal oxide represented by the following Formula 1 may be included as the positive electrode active material.

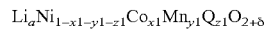

$$Li_aNi_{1-x1-y1-z1}Co_{x1}Mn_{y1}Q_{z1}O_{2+\delta} \quad \text{[Formula 1]}$$

In Formula 1, Q is at least one element selected from the group consisting of aluminum (Al), zirconium (Zr), titanium (Ti), magnesium (Mg), tantalum (Ta), niobium (Nb), molybdenum (Mo), and chromium (Cr), and $0.9 \leq a \leq 1.5$, $0 < x1 \leq 0.5$, $0 < y1 \leq 0.5$, $0 \leq z1 \leq 0.1$, and $-0.1 \leq \delta \leq 1.0$.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode material mixture layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode material mixture layer.

The negative electrode may include a negative electrode collector and a negative electrode material mixture layer which is formed on the negative electrode collector and includes a negative electrode active material, a conductive agent, and a binder.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_p(0<\beta<2)$, $SnO_2$, vanadium oxide, and lithium vanadium oxide; or a composite including the metallic compound and the carbonaceous material such as a Si—C composite or a Sn—C composite, and anyone thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The electrode may be prepared according to a typical method of preparing an electrode. Specifically, a composition for forming an electrode material mixture layer, which includes the electrode active material, the binder, the conductive agent, and a solvent, is coated on the electrode collector, and the electrode may then be prepared by drying and rolling the coated electrode collector.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used.

Also, as another method, the electrode may be prepared by casting the composition for forming an electrode material mixture layer on a separate support and then laminating a film separated from the support on the electrode collector.

The preparing of the electrode may include forming a multilayer electrode which includes forming a first electrode material mixture layer including a first electrode active material, a first conductive agent, and a first binder on a current collector, and forming a second electrode material mixture layer including a second electrode active material, a second conductive agent, and a second binder on the first electrode material mixture layer.

The multilayer electrode may be a multilayer positive electrode or multilayer negative electrode for a lithium secondary battery.

The first and second electrode active materials, the first and second conductive agents, and the first and second binders may be the same as the positive electrode active material, the negative electrode active material, the conductive agents, and the binders which have been previously described in the positive electrode and the negative electrode, respectively. The first and second electrode active materials forming the first and second electrode material mixture layers may be the same or may be different from each other.

For example, the first electrode active material and the second electrode active material, as the negative electrode active materials, may each include at least one selected from the group consisting of natural graphite and artificial graphite, and, more preferably, the first electrode active material may include natural graphite, and the second electrode active material may include artificial graphite.

(2) Shear Strength Data Obtaining Step

Next, shear strength (σ) data according to a cutting depth are obtained by obliquely cutting the electrode material mixture layer of the electrode from a surface thereof until reaching the current collector using a surface and interfacial cutting analysis system (SAICAS).

The surface and interfacial cutting analysis system (SAICAS) includes a device 100 for obliquely cutting a coated thin film sample from a surface thereof to an interface using a blade, wherein it is a system that may measure a force applied to the blade during a cutting process.

FIG. 1 is a view illustrating a process of cutting an electrode material mixture layer using the surface and interfacial cutting analysis system (SAICAS). As illustrated in FIG. 1, a blade 1 obliquely cuts an electrode material mixture layer 20 formed on a current collector 10 at a specific cutting angle θ with respect to a surface. Ina case in which the cutting is performed with a cutting angle as described above, cutting is performed while the blade descends diagonally in a depth direction of the electrode material mixture layer. The cutting of the electrode material mixture layer is performed until the blade reaches the current collector.

In this case, the cutting angle θ may be in a range of greater than 0° to 10° or less, preferably 1° to 5.7°, and more preferably 3° to 5.7°. Since the cutting angle θ is set within the above range, measurement time may not only be shortened, but accuracy of the shear strength data may also be improved.

Also, a running speed of the blade during the cutting of the electrode material mixture layer may be in a range of about 0.01 μm/s to about 10 μm/s in a horizontal direction and about 0.001 μm/s to about 1 μm/s in a vertical direction. Preferably, the running speed of the blade may be in a range of 0.1 μm/s to 1 μm/s in the horizontal direction and 0.01 μm/s to 0.1 μm/s in the vertical direction, and may be more preferably in a range of 0.1 μm/s to 0.5 μm/s in the horizontal direction and 0.01 μm/s to 0.05 μm/s in the vertical direction. Since resolution of the shear strength data is improved by adjusting the running speed of the blade within the above range, a range of minimum interval may be narrowly limited.

The blade is not particularly limited as long as it has a hardness higher than the electrode material mixture layer and its shape is not deformed in a cutting process, and, for example, the blade may be formed of a material, such as diamond, cubic boron nitride (BN), steel, cermet, and ceramic, and may more preferably be formed of cubic boron nitride (BN).

The blade, for example, may have a width of 0.1 mm to 4 mm, for example, 0.3 mm to 1 mm.

If the surface and interfacial cutting analysis system (SAICAS) is used, a horizontal force $F_h$ and a vertical force $F_v$, which are applied to the blade in the cutting process, may be measured. Thus, the horizontal force $F_h$ and the vertical force $F_v$, which are applied to the blade according to a cutting depth $t_0$, are measured using the surface and interfacial cutting analysis system (SAICAS), and shear strength ($\sigma$) data according to the cutting depth may be obtained by using the measured values.

Specifically, the shear strength ($\sigma$) may be calculated by the following Equation 1.

$$\sigma = \frac{F_h \cos\theta \sin\theta - F_v \sin^2\theta}{bt_0} \quad \text{[Equation 1]}$$

In Equation 1, $\sigma$ is the shear strength (N/mm$^2$), $F_h$ is the horizontal force (N) applied to the blade which is measured by the surface and interfacial cutting analysis system, $F_v$ is the vertical force (N) applied to the blade which is measured by the surface and interfacial cutting analysis system, $\theta$ is the cutting angle (°), b is the blade width (mm), and $t_0$ is the cutting depth (μm).

(3) Regression Curve Obtaining Step

After obtaining the shear strength data according to the cutting depth by the above processes, a regression analysis is performed on the shear strength data to obtain a regression curve. Fluctuation due to deformation of electrode particles exists in the shear strength ($\sigma$) data previously obtained by Equation 1 using the surface and interfacial cutting analysis system (SAICAS). A minimum interval in the shear strength ($\sigma$) data may be clearly and simply selected by simplifying the shear strength data through the regression analysis.

In this case, the regression curve may be obtained through polynomial regression, and, more specifically, may be obtained by using a fourth-order polynomial regression equation represented by Equation 2 below. In this case, x-axis of the regression curve represents the cutting depth, and y-axis represents the shear strength.

$$\sigma = A_0 + A_1 d + A_2 d^2 + A_3 d^3 + A_4 d^4 \quad \text{[Equation 2]}$$

In Equation 2, $\sigma$ is the shear strength (N/mm$^2$), $A_0$, as shear strength when the cutting depth is 0 μm, is a positive number, $A_1$, $A_2$, $A_3$, and $A_4$ are constants obtained by the polynomial fourth-order equation, and d is the cutting depth (μm)

(4) Cohesive Failure Location Determining Step

A location of cohesive failure may be identified from the regression curve obtained in step (3). Specifically, a cutting depth, at which the shear strength is minimum in the regression curve, is determined as the location of cohesive failure.

In a particle-based coating layer such as the electrode for a lithium secondary battery electrode, a binding force between particles is reflected in a shear strength value, and a frictional force of the blade is less reflected. That is, the shear strength reflects resistance felt when peeling the electrode. Thus, there is a high probability that cohesive failure occurs at a portion with the lowest shear strength. Therefore, the cutting depth, at which the shear strength is minimum, may be determined as the location of cohesive failure.

Since the cutting depth has the same value as a depth in a direction of the current collector from the surface of the electrode material mixture layer, the cutting depth may be determined as an electrode depth.

According to the analysis method of the present invention, the location where the cohesive failure occurs may be quantitatively evaluated, and the composition of the electrode material mixture layer or process conditions of producing the electrode may be adjusted by predicting physical properties of the electrode based on the quantified location of cohesive failure. For example, in a case in which the location of cohesive failure is close to a surface side of the electrode, there is a high possibility that low-voltage characteristics are degraded due to exfoliation of the active material. Thus, in the case that the location of cohesive failure measured according to the analysis method of the present invention is near the surface of the electrode, improvement measures, such as an increase in binder content in the electrode material mixture layer or changes in process conditions, may be derived.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

Natural graphite as a negative electrode active material, carbon black as a conductive agent, and a carboxylmethyl cellulose (CMC) and a styrene butadiene rubber (SBR), as a binder, were added at a weight ratio of 96.5:0.5:1.0:2.0 to distilled water and then mixed to prepare a negative electrode slurry (solid content: 40 wt %). One surface of a copper current collector was coated with the negative electrode slurry, dried at 100° C., and then rolled to prepare a negative electrode (current collector 10 μm, negative electrode material mixture layer 80 μm).

For the negative electrode prepared as described above, after a blade was positioned parallel to a surface of an electrode material mixture layer until 0.03 N of vertical force was applied by using a surface and interfacial cutting analysis system (SAICAS, SAICAS-DN, Dipla Wintes, Japan), a horizontal force and a vertical force, which were applied to the blade, were measured while cutting was performed by advancing the cubic boron nitride blade at a horizontal velocity of 0.5 μm/s and a vertical velocity of 0.05 μm/s (cutting angle 5.7°) in a constant velocity mode, and shear strength ($\sigma$) according to a cutting depth was calculated using the following Equation 1. Shear strength data calculated were illustrated in FIG. 2.

$$\sigma = \frac{F_h \cos\theta \sin\theta - F_v \sin^2\theta}{bt_0} \quad \text{[Equation 1]}$$

In Equation 1, $\sigma$ is the shear strength (N/mm$^2$), $F_h$ is the horizontal force (N) applied to the blade which is measured by the surface and interfacial cutting analysis system, $F_v$ is the vertical force (N) applied to the blade which is measured by the surface and interfacial cutting analysis system, θ is the cutting angle (°), b is a blade width (mm), and $t_0$ is the cutting depth (μm).

The shear strength (σ) data obtained were simplified by using a fourth-order polynomial regression equation represented by the following Equation 2 to obtain a regression curve. The regression curve was illustrated in FIG. 2.

$$\sigma = A_0 + A_1 d + A_2 d^2 + A_3 d^3 + A_4 d^4 \quad \text{[Equation 2]}$$

In Equation 2, σ is the shear strength (N/mm²), $A_0$, as shear strength when the cutting depth is 0 μm, is a positive number, $A_1$, $A_2$, $A_3$, and $A_4$ are constants obtained by the polynomial fourth-order equation, and d is the cutting depth (μm).

Example 2

Natural graphite as a negative electrode active material, carbon black as a conductive agent, and a carboxylmethyl cellulose (CMC) and a styrene butadiene rubber (SBR), as a binder, were added at a weight ratio of 95.35:0.5:1.15:3.0 to distilled water and then mixed to prepare a first negative electrode slurry (solid content: 40 wt %).

Artificial graphite as a negative electrode active material, carbon black as a conductive agent, and a carboxylmethyl cellulose (CMC) and a styrene butadiene rubber (SBR), as a binder, were added at a weight ratio of 97.45:0.5:1.15:0.9 to distilled water and then mixed to prepare a second negative electrode slurry (solid content: 40 wt %).

After one surface of a copper current collector was coated with the first negative electrode slurry, the second negative electrode slurry was coated thereon, dried at 100° C., and then rolled to prepare a negative electrode (current collector 10 μm, first negative electrode material mixture layer 40 μm, second negative electrode material mixture layer 40 μm).

For the negative electrode prepared as described above, shear strength data and a regression curve were obtained in the same manner as in Example 1 by performing cutting using the surface and interfacial cutting analysis system (SAICAS, SAICAS-DN, Dipla Wintes, Japan), and the results thereof are presented in FIG. 3.

Example 3

Artificial graphite as a negative electrode active material, carbon black as a conductive agent, and a carboxylmethyl cellulose (CMC) and a styrene butadiene rubber (SBR), as a binder, were added at a weight ratio of 95.35:0.5:1.15:3 to distilled water and then mixed to prepare a first negative electrode slurry (solid content: 40 wt %).

Artificial graphite as a negative electrode active material, carbon black as a conductive agent, and a carboxylmethyl cellulose (CMC) and a styrene butadiene rubber (SBR), as a binder, were added at a weight ratio of 97.45:0.5:1.15:0.9 to distilled water and then mixed to prepare a second negative electrode slurry (solid content: 40 wt %).

After one surface of a copper current collector was coated with the first negative electrode slurry, the second negative electrode slurry was coated thereon, dried at 100° C., and then rolled to prepare a negative electrode (current collector 10 μm, first negative electrode material mixture layer 40 μm, second negative electrode material mixture layer 40 μm).

For the negative electrode prepared as described above, shear strength data and a regression curve were obtained in the same manner as in Example 1 by performing cutting using the surface and interfacial cutting analysis system (SAICAS, SAICAS-DN, Dipla Wintes, Japan), and the results thereof are presented in FIG. 4.

Experimental Example: Electrode Peeling Test

Peeling tests were performed on the negative electrodes prepared in Examples 1 to 3 using TA-305A (Texture technologies) under conditions including 90° peel, 300 mm/s, and a tape width of 20 mm to measure a remaining thickness of the electrode after peeling, and a depth at which the peeling occurred was measured therefrom. Measurement results are presented in Table 1. Also, for comparison, locations of cohesive failure, which were obtained from the regression curves of FIGS. 2 to 4, are listed in Table 1. Referring to FIGS. 2 to 4, with respect to Example 1 and Example 3, it may be confirmed that minimum values of shear strength were obtained when the cutting depths in the regression curves were about 76 μm and about 73 μm, respectively, and, with respect to Example 2, a minimum value of shear strength was obtained when the cutting depth in the regression curve was about 24 μm.

TABLE 1

|  | Remaining thickness of electrode after peeling (μm) | Peeling depth (μm) | Location of cohesive failure shown in regression curve (cutting depth) (μm) |
| --- | --- | --- | --- |
| Example 1 | 5 (negative electrode material mixture layer) + 10 (current collector) | 75 | 76 |
| Example 2 | 58 (negative electrode material mixture layer) + 10 (current collector) | 24 | 24 |
| Example 3 | 7 (negative electrode material mixture layer) + 10 (current collector) | 73 | 73 |

Referring to Table 1, it may be confirmed that the locations of cohesive failure, which were measured by the analysis method of the present invention, and the actual locations where peeling occurred in the peeling tests were almost identical.

According to the present invention, a location of cohesive failure of an electrode may be quantitatively predicted in a preparation step of the electrode without performing secondary battery preparation and battery characteristics evaluation steps. As described above, a composition of the electrode and process conditions may be more efficiently improved by identifying the location of cohesive failure of the electrode in the preparation step of the electrode and identifying a cause of the cohesive failure.

What is claimed is:
1. A method of analyzing cohesive failure of an electrode, the method comprising:
preparing an electrode in which an electrode material mixture layer including an electrode active material, a conductive agent, and a binder is formed on a current collector;
obtaining shear strength (σ) data according to a cutting depth by obliquely cutting the electrode material mixture layer from a surface of the electrode until reaching the current collector using a surface and interfacial cutting analysis system (SAICAS);
obtaining a regression curve of shear strength according to the cutting depth from the shear strength (σ) data;

determining a cutting depth, at which the shear strength is minimum in the regression curve, as a location of cohesive failure; and adjusting a composition of the electrode material mixture layer or process conditions based on the determined location of cohesive failure.

2. The method of claim 1, wherein the electrode material mixture layer is obliquely cut at a cutting angle of greater than 0° to 10° or less.

3. The method of claim 1, wherein a running speed of a blade during the cutting of the electrode material mixture layer is in a range of 0.01 μm/s to 10 μm/s in a horizontal direction and 0.001 μm/s to 1 μm/s in a vertical direction.

4. The method of claim 1, wherein the shear strength (σ) data according to the cutting depth is calculated by Equation 1:

$$\sigma = \frac{F_h \cos\theta \sin\theta - F_v \sin^2\theta}{b t_0} \quad \text{[Equation 1]}$$

wherein, in Equation 1, σ is shear strength (N/mm²), $F_h$ is a horizontal force (N) applied to a blade which is measured by the (SAICAS), $F_v$ is a vertical force (N) applied to the blade which is measured by the (SAICAS), θ is a cutting angle (°), b is a blade width (mm), and $t_0$ is a cutting depth (μm).

5. The method of claim 1, wherein the regression curve of the shear strength according to the cutting depth is obtained by performing a fourth-order polynomial regression analysis on the shear strength data.

6. The method of claim 1, wherein the preparing of the electrode comprises forming a multilayer electrode which includes forming a first electrode material mixture layer including a first electrode active material, a first conductive agent, and a first binder on a current collector, and forming a second electrode material mixture layer including a second electrode active material, a second conductive agent, and a second binder on the first electrode material mixture layer.

7. The method of claim 6, wherein the first electrode active material and the second electrode active material comprise at least one selected from the group consisting of natural graphite and artificial graphite.

8. The method of claim 1, wherein the adjusting a composition of the electrode material mixture layer or process conditions based on the determined location of cohesive failure comprises increasing binder content in the electrode material mixture layer.

\* \* \* \* \*